United States Patent [19]

Vancil

[11] Patent Number: 5,297,335
[45] Date of Patent: Mar. 29, 1994

[54] METHOD FOR REPAIRING ELECTRICAL CABLE IN NUCLEAR POWER PLANT

[76] Inventor: Paul H. Vancil, P.O. Box 1894, Glen Rose, Tex. 76043

[21] Appl. No.: 929,314

[22] Filed: Aug. 13, 1992

[51] Int. Cl.$^5$ .................... H01R 11/00; H01R 43/00
[52] U.S. Cl. ........................................ 29/868; 439/502
[58] Field of Search .................... 439/502–506, 439/638, 651–654; 307/147; 174/49; 29/868, 869, 402.01, 402.03, 402.08

[56] References Cited

U.S. PATENT DOCUMENTS

| | | | |
|---|---|---|---|
| 1,010,278 | 11/1911 | Lisberger et al. | |
| 1,923,939 | 8/1933 | Lavarack | |
| 2,610,996 | 9/1952 | Rickabaugh | 439/713 |
| 3,144,502 | 8/1964 | Weiss | 307/147 |
| 3,457,640 | 7/1969 | Rayburn | 29/884 |
| 4,146,287 | 3/1979 | Jonsson | 174/49 |
| 4,428,115 | 1/1984 | Campbell et al. | 29/873 |
| 4,708,664 | 11/1987 | Yard | 439/471 |
| 4,775,802 | 10/1988 | Dods | 439/502 |
| 4,817,282 | 4/1989 | Markwardt | 29/868 |
| 4,900,270 | 2/1990 | Edwards et al. | 439/502 |
| 5,053,637 | 10/1991 | Dillard | 307/147 |

FOREIGN PATENT DOCUMENTS

| | | | |
|---|---|---|---|
| 2-112183 | 4/1990 | Japan | 439/502 |
| 3-122980 | 5/1991 | Japan | 439/638 |
| 618701 | 2/1949 | United Kingdom | 307/147 |

*Primary Examiner*—Neil Abrams
*Attorney, Agent, or Firm*—Ross, Howison, Clapp & Korn

[57] ABSTRACT

A quick disconnect system and method for repairing and preventing further damage to cables, conductors, or wiring, such as control cables in a nuclear power plant extending from a control room to numerous motor operators for valves located within a radioactive hot-zone. The method includes the steps of determinating the electrical cable from the motor operator, removing any damaged portion of the electrical cable, installing a terminal box near the point of removal, reterminating the undamaged electrical cable to the inlet of the terminal box, installing an extension cable between the terminal box and the motor operator, and terminating the extension cable to the motor operator with a multi-contact mating connector.

1 Claim, 1 Drawing Sheet

METHOD FOR REPAIRING ELECTRICAL CABLE IN NUCLEAR POWER PLANT

TECHNICAL FIELD

This invention relates to electrical connections, and more particularly, to a quick disconnect system and method for repairing damaged conductors which terminate at motor operators for valves in a nuclear power generating plant.

BACKGROUND OF THE INVENTION

A primary concern in the construction, operation and maintenance of nuclear power generating facilities is the possible hazard of exposure to harmful levels of radiation. In response to both public and private concern for safety to humans and the environment, an operating nuclear facility is required to undergo frequent inspections and periodic preventative maintenance to quickly identify components requiring adjustment, troubleshooting, removal or replacement. Often, this requires a maintenance team to enter and spend a significant amount of time conducting inspections and repairs in hot-zones such as the nuclear reactor area.

This regular maintenance includes periodic removal of numerous motor operators for valves from the hot-zone for inspection and repair. In so doing, all electrical connections, such as cables and conductors extending from the motor operators to the plant control board, must be disconnected or determinated at the valve. Repeated disconnection, reconnection and pulling of conductors commonly results in damaged or broken lugs, terminals, wires and conductor insulation. These damaged parts must be repaired or replaced in the hot-zone before the motor operator is reinstalled, thereby prolonging the workers' exposure to harmful levels of radiation.

Currently, damaged conductor insulation is commonly repaired using a heat shrinkable Raychem patch over the damaged area. Since the addition of a heat shrinkable patch increases the overall diameter of the insulation on the conductor, a tighter constraint is created between the adjacent cables. This additional constraint heightens the probability that further damage to the electrical conductors will occur during subsequent handling.

When damage to the connections is minor, lugs can be replaced and conductors can be cut back behind the damaged area. Both of these procedures decrease the length of the conductor and its cable. After repeated repairs, the remaining cable becomes too short to reach the valve and must be replaced. Replacement of a cable usually requires that the old cable be pulled from its hot-zone termination at the valve back to its initial termination in the cable spread room. Typically, the cable spread room is several hundred feet away from the motor control area. Therefore, both old and new cables must be pulled and reinstalled through various levels of the plant and through numerous penetrations of the nuclear facility's interior concrete walls. These penetrations must then be resealed for fire prevention and contamination protection.

The present system and method of maintaining electrical connections from the control board to the motor operators result in costly and time consuming hot-zone repairs with much down time delay. There exists an immediate need for an improved system and method for the construction, maintenance and repair of the motor operator and the electrical connections attached thereto which limits workers' exposure to dangerous levels of radiation. The present invention meets this need.

SUMMARY OF THE INVENTION

According to the present invention, a system and method are provided for fast, efficient disconnection, removal and reinstallation of an electrically operated unit such as a motor operator for a valve located in a hot-zone of a nuclear reactor.

According to a preferred embodiment of the invention, a system is provided that comprises a terminal box, an undamaged electrical cable end, means for connecting inlet of terminal box to the undamaged cable end and means for connecting the outlet of the terminal box to the motor operator.

According to a preferred embodiment of the invention, the terminal box comprises a plurality of removable terminal blocks.

According to another preferred embodiment of the invention, the means for connecting the extension cable comprises a multi-contact mating connector. According to another preferred embodiment of the invention, the multi-contact mating connector comprises a movable portion and a stationary portion. According to another preferred embodiment of the invention, the movable portion of the mating connector is flexibly attached to the outgoing cable of the terminal box and the stationary portion is fixed to the motor operator.

According to another embodiment of the invention a method is provided for repairing an electrical cable between a motor operator and a control board, comprising the steps of determinating the electrical cable from the motor operator, creating an undamaged electrical cable end by removing any damaged portion of the electrical cable, installing a terminal box at or near the point of removal, reterminating the undamaged electrical cable to the terminal box, and terminating one end of an extension cable to one end of the terminal box and the other end of the extension cable to the motor operator.

According to another preferred embodiment of the invention, the extension cable is connected to the motor operator with a multi-contact mating connector.

BRIEF DESCRIPTION OF THE DRAWINGS

The system and method of the invention are further described and explained in relation to the following figures of the drawings wherein.

Like reference numerals are used to indicate like parts in all figures of the drawings.

DESCRIPTION OF THE PREFERRED EMBODIMENTS

Figure 1:
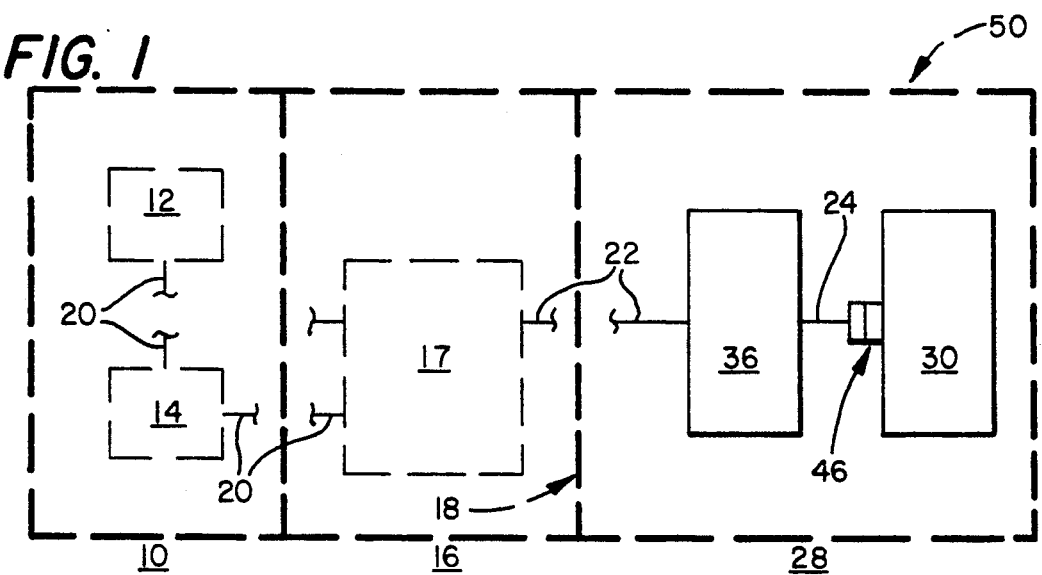
FIG. 1 is a simplified schematic diagram depicting the structure and relative placement of apparatus preferred for use in practicing the system and method of the invention.
Figure 2:
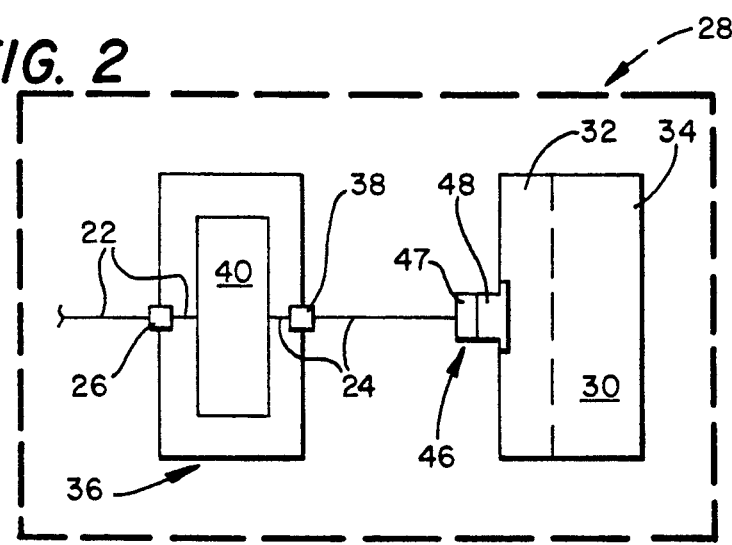
FIG. 2 is an enlarged schematic diagram depicting in greater detail the reactor area of FIG. 1.

As shown in FIG. 1, the system and method of the invention are particularly useful in a nuclear power facility 50 which comprises a control area 10, cable spread area 16, and reactor area 28 containing numerous motor operators 30 for valves, only one of which is depicted for illustrative purposes. Referring to FIG. 1, a typical nuclear power facility 50 has control board 12 and motor control cabinet 14 located within the control area 10 and electrically connected to cable spread area 16 and cable tray 17 by control wires 20. Cable spread area 16 is used to distribute electrical power through a plurality of electrical cables 22 to motor operators 30. Each operator 30 further comprises limit switch compartment 32 and valve components 34 as shown in FIG. 2. Cable 22 typically comprises conventional insulation, conductors, and terminals or lugs.

Referring to FIGS. 1 and 2, according to a preferred embodiment of the invention, cable 22 is determinated from operator 30 and reterminated to terminal cabinet 36. A suitable terminal cabinet 36 adaptable for use in the present invention may include a hinged access door and removable terminal blocks. Termination of cable 22 to terminal cabinet 36 is preferably accomplished by permanently connecting cable 22 to removable terminal block 40 housed within terminal cabinet 36 at inlet 26. The electrical connection between cable 22 and motor operator 30 is reestablished when extension cable 24 is terminated between terminal cabinet 36 and operator 30 at outlet 38.

It will be understood and appreciated by one skilled in the art that frequently cables are run between termination points through flexible conduits (not shown) and often must penetrate structural barriers such as partition 18.

According to a preferred embodiment of the invention, multi-contact mating connector 46 is preferably used between extension cable 24 and operator 30 to reestablish the electrical connection. Multi-contact mating connector 46 further comprises a movable portion 47 attached to extension cable 24 and a stationary portion 48 fixed to the limit switch compartment 32 of operator 30.

Figure 3:
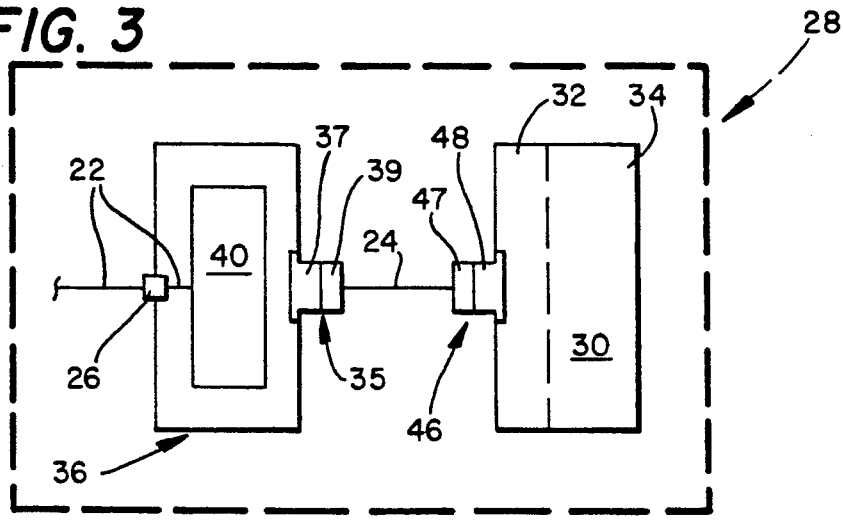
FIG. 3 is an enlarged schematic diagram depicting an alternate embodiment of the reactor area of FIG. 2.

According to another preferred embodiment of the invention, outlet 38 can be a multi-contact mating connector 35 as shown in FIG. 3. Stationary portion 37 of connector 35 is fixed to terminal cabinet 36 and movable portion 39 is attached to extension cable 24.

Use of connector 35 or 46 decreases the amount of time needed to remove valve components 34 for inspection and repair. Use of the system and method of the present invention leaves the termination of cable 22 at terminal cabinet 36 undisturbed, placing no additional stress on the cable's insulation, conductors or lugs. The likelihood of damage to cable 22 during operator 30 inspection and repair is substantially reduced, thereby virtually eliminating the need for time-consuming repairs in the hot-zone, such as large diameter repairs to the insulation, or pulling and reinstalling long runs of cable 22 from the cable spread area 16 to the reactor area 28.

Instead, the stress placed on cables and connections during removal and inspection of operator 30 is limited to extension cable 24, and mating connector 46. If any damage occurs to cable 24 or mating connector 46, the damaged component or unit may be quickly removed from the system and replaced immediately or repaired in a maintenance shop located outside the hot-zone.

In addition, a cut-off switch, not shown, could be built into terminal cabinet 36 to allow the maintenance team to conveniently shut off power during removal and reinstallation of operator 30.

Other alterations and modifications of the invention will likewise become apparent to those of ordinary skill in the art upon reading the present disclosure, and it is intended that the scope of the invention disclosed herein be limited only by the broadest interpretation of the appended claims to which the inventor is legally entitled.

I claim:

1. A method for repairing a damaged portion of an electrical cable extending between a motor operator for a motor operated valve and a control board in a nuclear power plant, comprising the steps of:
    a. determinating said electrical cable from said motor operator;
    b. removing the damaged portion of said electrical cable;
    c. installing an electrical terminal box at or near the point of removal;
    d. reterminating the electrical cable at the terminal box;
    e. providing an extension cable sufficiently long to extend between the terminal box and the motor operator to establish an electrical connection between the motor operator and the control board.

* * * * *